Patented Sept. 29, 1953

2,653,928

UNITED STATES PATENT OFFICE 2,653,928

HETEROCYCLIC AZO-DYESTUFF DERIVATIVES

Charles Graenacher, Riehen, and Heinrich Bruengger and Adolf Emil Siegrist, Basel, Switzerland, assignors to Ciba Limited, Basel, Switzerland, a Swiss firm No Drawing. Application July 13, 1950, Serial No. 173,673. In Switzerland July 22, 1949

9 Claims. (Cl. 260—152)

The present invention is based on the observation that new and valuable derivatives of azo dyestuffs can be made by reacting one molecular proportion of an azo dyestuff which is free from groups imparting solubility and contains the atomic grouping

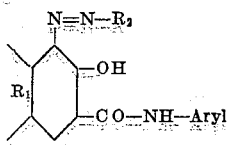

in which $R_1$ represents a cyclic radical condensed on to the benzene ring at the positions indicated by the valency bonds, and $R_2$ represents the radical of a diazo component containing an aroyl-amino group, with two molecular proportions of an acid monohalide of the general formula

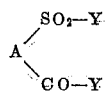

in which A represents a 5-membered heterocyclic ring consisting of 4 carbon atoms bound together by conjugate double bonds and one sulfur atom or advantageously one oxygen atom, and one Y represents a hydroxyl group and the other Y a halogen atom.

As compounds containing an aroyl amino group there are to be understood compounds which contain the atomic grouping

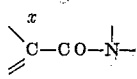

in which the carbon atom marked $x$ forms part of an aromatic nucleus.

A number of the dyestuffs of the above formula are known, especially as pigments produced on the fiber. As is known the dyestuffs can also be prepared in substance in a simple manner by coupling the diazo compound containing an aroyl-amino group with a coupling component which contains the atomic grouping

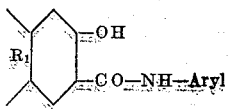

As diazo compounds there may be used diazotized bases containing an aroylamino group such as are customarily used for the manufacture of ice colours, for example bases having the constitution

in which B represents a benzene radical which may contain further substituents and in which the groups aroyl—HN— and —NH₂ preferably stand in para-position to one another. Especially noteworthy in this connection are the diazo compounds of amines of the general formula

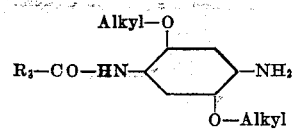

in which $R_3$ represents an aromatic radical of the benzene series bound directly to the —CO— group, which radical may, if desired, also contain substituents such as halogen atoms or methyl groups, and in which the alkyl groups advantageously contain only a few for example up to four; but preferably one or two carbon atoms.

As examples of diazo components which may be used with advantage for preparing the dyestuffs serving as starting materials in the present process, there may be mentioned: 4-benzoylamino-5-methoxy-2-chloro - 1 - aminobenzene, 4-benzoyl-amino-5-methyl-2-methoxy-1-aminobenzene, 4-benzoylamino-2:5-dimethoxy - 1 - aminobenzene, 4-benzoylamino-2:5-dipropyloxy - 1 - aminobenzene, 4 - benzoylamino-2:5-di-butyloxy-1-aminobenzene, 4-benzoylamino-2-ethoxy-5-methoxy-1-aminobenzene and principally 4-benzoylamino-2:5-diethoxy-1-aminobenzene.

As coupling components there may be used, for example, compounds of the general formulae

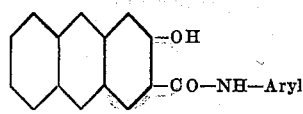

and

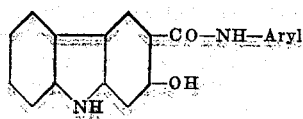

and especially those of the general formula

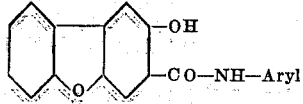

and above all those of the general formula

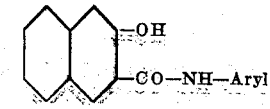

The aryl residue may be, for example, a naphthalene radical such as 1- or 2-naphthyl or a radical of the benzene series such, for example, as phenyl, 2-methyl-phenyl, 2-methoxy-phenyl, 4-chloro - 2 - methyl-phenyl, 2:5 - dimethoxy-4-chloro-phenyl, 2:4 - dimethoxy-5-chloro-phenyl, 2-methyl-4-methoxy-phenyl and the like.

As acid mono halides of the above mentioned formula

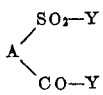

there come into consideration for use in the present process the mono halides, for example, the mono bromides and above all the mono chlorides, of furane-2-carboxylic acid-3-sulfonic acid, of 3:4-dichloro-furane-2-carboxylic acid-5-sulfonic acid, of 5-chloro-furane-2-carboxylic acid-3-sulfonic acid, of 5-bromo-furane-2-carboxylic acid-3-sulfonic acid, and especially of thiophene-2-carboxylic acid-5-sulfonic acid or advantageously of furane-2-carboxylic acid-5-sulfonic acid.

There may be used as acid halide for this invention either a sulfonic acid halide-carboxylic acid of the constitution

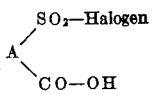

or a carboxylic acid halide-sulfonic acid of the constitution

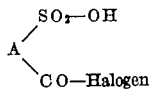

For the present invention there are principally suitable those acid halides of the above kind which contain the group —CO—Halogen, especially the group —COCl, wherein the —SO₃H group also capable of forming an acid halide group is not converted into an —SO₂—Halogen group.

The acid halides of the general formula

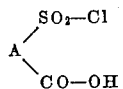

which can also be used for the instant process may be obtained, for example, by reacting a carboxylic acid of the formula

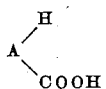

with chlorosulfonic acid. The preparation is advantageously carried out by introducing the acid in question at room temperature into an excess of chlorosulfonic acid, then allowing the mixture to react for a short time at a raised temperature, for example, at about 100° C., cooling the mixture and pouring it onto ice, taking up the resulting acid chloride in an organic solvent, for example, in ether, dehydrating the resulting solution, and finally distilling off the solvent.

Acid halides of the general formula

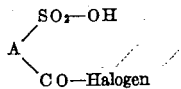

may be prepared, for example, by sulfonating an acid halide of the constitution

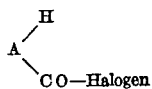

The sulfonation may be conducted for example, at a low temperature by means of sulfur trioxide in liquid sulfur dioxide or with special advantage in methylene chloride (CH₂Cl₂).

An especially advantageous method for preparing acid halides of the last mentioned formula consists in reacting an acid of the formula

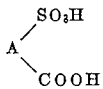

especially furane-2-carboxylic acid-5-sulfonic acid or thiophene-2-carboxylic acid-5-sulfonic acid with the aid of aromatic sulfonic acid halide such as benzene sulfonic acid chloride, para-toluene sulfonic acid bromide or para-toluene sulfonic acid chloride, or, with special advantage, with the aid of phosgene. As a rule it is desirable to conduct this reaction in the presence of a tertiary organic base, for example, trimethylamine, triethylamine, N-methyl-morpholine or advantageously pyridine. When the reaction is conducted in the absence of pyridine and in the presence of trimethylamine or triethylamine, it is generally of advantage in order to obtain a smooth reaction to work with the addition of an inert organic solvent such as benzene, chlorobenzene, ortho-dichlorobenzene, 1:2:4-trichlorobenzene, nitrobenzene, dioxane etc. These methods also have the advantage that the mixture so obtained, which contains a desired carboxylic acid halide-sulfonic acid, can be used directly for reaction with the dyestuffs in accordance with the present process.

Such mixtures are advantageously prepared by first introducing the acid of the formula

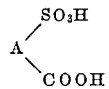

into pyridine, and then adding at a moderately raised temperature, for example, at 30–40° C., the acid halide (for example, para-toluene sulfonic acid chloride, or introducing gaseous phosgene).

An especially valuable acylating agent is obtained by adding to the mixture obtained as described above a stronger tertiary base than pyridine, for example, trimethylamine or advantageously triethylamine. Thus, for example, the dibasic acid of the formula

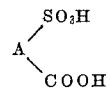

may be mixed with pyridine, then the acid halide is added or phosgene is introduced, and finally triethylamine is also added. Alternatively, such dibasic acid may be mixed with an inert organic solvent, a suitable tertiary base (advantageously triethylamine) and the dyestuff, and then the acid halide is added to this mixture or phosgene is introduced into it. Finally, an acid halide of the formula first given above, such, for example, as furane- or thiophene-2-carboxylic acid-5-sulfonic acid chloride or furane- or thiophene-2-carboxylic acid chloride-5-sulfonic acid (prepared, for example, by one of the other methods described above), may be mixed with the addition of an inert organic solvent with triethylamine and the dyestuff, and the acylation of the dyestuff is then carried out at a raised temperature. By all these methods the residue

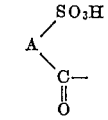

is very easily introduced twice into the dyestuff molecule. Thus, on the one hand, the hydroxyl group of the radical of the coupling component is esterified and, on the other, a second acyl radical enters into the —NH—Acyl group. Even when an acid halide of the formula

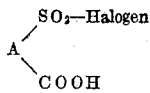

is used for the acylation there is obtained an acyl derivative of the above constitution and not one containing the acyl residue

[see also Ruggli, Helvetica Chimica Acta, vol. 24, page 197 (1941)].

The dyestuff derivatives so obtained are generally easily soluble in water. It is easy to establish that no starting material is still present in the reaction mixture by ascertaining whether a test portion diluted with acidulated water contains any water-insoluble dyestuff.

The reaction mixture may be worked up, for example, by pouring the whole, after cooling, into a dilute mineral acid, for example, sulfuric acid, precipitating the dyestuff from the acid solution by the addition of sodium chloride, separating the dyestuff and, if desired, purifying it by dissolution in water and reprecipitation by means of sodium chloride. If the reaction mixture contains an organic solvent which is insoluble or sparingly soluble in water, the solvent may be removed, for example, by distillation, if desired, under reduced pressure, after the introduction of the mixture into dilute mineral acid and the addition of sodium chloride.

The dyestuff derivatives obtainable by the present process are new. According to present knowledge (compare Helvetica Chimica Aceta, vol. 24, Fasc. Extraord., pages 50–57) they correspond to the general formula

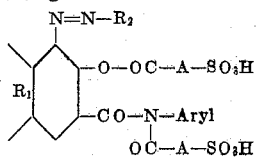

in which R₁ represents a cyclic radical condensed on to the benzene radical in the manner indicated, R₂ represents the radical of a diazo component containing an aroylamino group, and A represents a 5-membered heterocyclic ring consisting of 4 carbon atoms bound together by conjugate double bonds and one sulfur or oxygen atom.

Apart from the —SO₃H groups indicated in the formula they contain no groups imparting solubility.

The new dyestuff derivatives obtainable by the present process are relatively stable towards dilute acids, especially at low temperatures. Unexpectedly, however, they are easily split up by weak alkalis with the regeneration of the insoluble dyestuff used as starting material. Thus, a quite short treatment with a cold dilute aqueous solution of ammonia suffices to reconvert these dyestuff derivatives practically completely into the original dyestuffs.

Owing to these properties the new dyestuff derivatives obtainable by the present process are very valuable products, which are especially suitable for the production of textile dyeings, for example, foulard dyeings, and for use in calico printing.

Very valuable results are obtained by treating with alkalis, preferably ammonia, prints produced in known manner by means of acid to neutral printing pastes, which contain a dyestuff derivative obtained by the present process. This treatment with alkali is advantageously carried out with weak and dilute alkalis, if desired, with gaseous ammonia. The present invention also includes such a printing process.

Dyestuff derivatives of a constitution similar to those of the present invention are described in British Patent No. 480,358. However, printing with those known dyestuff derivatives entails certain difficulties, since the hydrolysis of those products generally requires a certain time. If it is attempted in the case of prints produced with these known dyestuff derivatives to hydrolyze them, for example, by treatment with alkalis, the hydrolysis is frequently so slow that there is sufficient time for the soluble dyestuff derivative to be dissolved from the fiber. In this manner not only are the parts originally printed weakened in dyeing strength, but the dyestuff derivative removed by dissolution frequently colours the unprinted parts. By the process of British Patent No. 512,664 it is sought to overcome this disadvantage of the known products by carrying out the hydrolysis in a concentrated salt solution, the high salt content being intended to prevent dissolution of the soluble dyestuff derivative, or by adding small quantities of suitable salts such, for example, as alkaline earth metal salts which rapidly convert the soluble dyestuff derivatives into sparingly soluble metal compounds and so retard the dissolution. However, these methods are always complicated and involve procedures so unusual for dyers that they cannot practice these methods.

As compared with these known methods the process by which the new products of the present invention are used, has the advantage that it is extraordinarily simple to carry out. The printing process itself as well as the necessary subsequent hydrolysis can be carried out by normal procedures and, apart from the new dyestuff derivatives, it involves the use of no abnormal substances, no relatively large quantities of auxiliary agents and no special apparatus. Furthermore, the ease with which the new dyestuff derivatives are hydrolyzed enables rapid and smooth working and also protects the material to be printed and also the apparatus to a great extent from injurious influences, since neither high temperatures nor harmful reagents are necessary for the hydrolysis.

Moreover, the known dyestuff derivatives of British Patent No. 480,358 are not always satisfactory for dyeing fibers of animal origin, especially wool, because, owing to their resistance to alkalis, they can be hydrolyzed only by a relatively energetic or prolonged treatment with alkali, preferably a treatment with a solution of an alkali hydroxide. The dyestuff derivatives of the present invention, on the other hand, are very well suited for dyeing and printing wool since, owing to their relatively good stability towards acids, they can be used for dyeing in the usual manner from acid baths, and then regenerated on the wool fiber to form the insoluble initial products by a very mild treatment which does not in any way injure the wool, for example, by a short treatment in a cold dilute solution of ammonia. Instead of carrying out the hydrolysis in the cold by a treatment with alkali, the azo dyestuff derivatives applied by dyeing in the usual manner, for example, from a sulfuric acid bath, may be easily hydrolyzed on the fiber by a treatment of longer duration in a neutral to acid medium at a raised temperature, for example, at 95–100° C. In this way there are obtained valuable dyeings which may be distinguished principally by good properties of wet fastness and good fastness to crocking.

The following examples illustrate the invention, the parts and percentages being by weight unless otherwise stated and the relationship of parts by weight to parts by volume being the same as that of the kilogram to the litre:

Example 1

17.2 parts of furane-2-carboxylic acid-5-sulfonic acid are dissolved in 120 parts by volume of dry pyridine while stirring, and 11.5 parts of the azo dyestuff from diazotized 4-benzoylamino-2:5-diethoxy-1-aminobenzene and (2'-hydroxy-3'-naphthoylamino)-benzene are added. 10.7 parts of phosgene are introduced into the mixture at 30–40° C. in the course of about 1½ hours, and then the whole is heated at 90–95° C. After a reaction period of about 2 hours the blue initial pigment is dissolved, and a test portion of the reaction mixture is soluble in water to give a clear solution having a brown coloration. The reaction mixture is cooled to room temperature, a mixture of 450 parts of water and 63 parts of concentrated sulfuric acid are stirred in, 30 parts of sodium chloride are added, and the whole is heated to 40–50 C., after which the reaction product separates well in the form of a resinous deposit. After pouring off the acid pyridine liquor, the residue is dissolved in 400 parts of water while heating to 40–50° C., and is again precipitated in a resinous form by the addition of 60 parts of sodium chloride at 40–50° C., and dried in vacuo at 40–50° C. after separating the salt liquor. The reaction product which corresponds to the formula

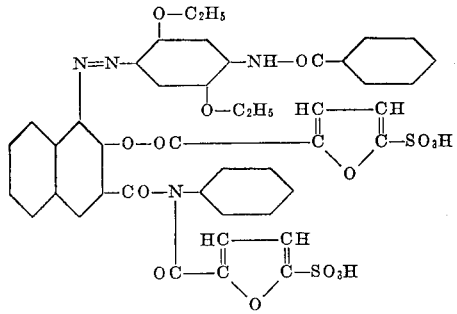

is a brown powder which easily dissolves in water to give a clear solution having a brown coloration, and from which solution the insoluble blue initial pigment is rapidly reprecipitated by hydrolysis with dilute alkalis, for example, ammonia.

Acylated dyestuffs of similar properties are obtained if the furane-2-carboxylic acid-5-sulfonic acid in this example is replaced by an equivalent quantity of furane-2-carboxylic acid-3 - sulfonic acid, 5-chloro-furane-2-carboxylic acid-3-sulfonic acid, 5-bromo-furane-2-carboxylic acid-3-sulfonic acid, or 3:4-dichloro-furane-3-carboxylic acid-5-sulfonic acid.

Example 2

4.8 parts of furane-2-carboxylic acid-5-sulfonic acid are dissolved in 40 parts by volume of dry pyridine while stirring and 3.6 parts of the azo dyestuff from diazotized 4-benzoylamino-2:5-diethoxy-1-aminobenzene and (2'-hydroxy-3'-naphthoylamino)-benzene are added. 5.2 parts of para-toluene sulfochloride followed by 11.6 parts of triethylamine are added to the reaction mixture. The reaction mixture is then heated to 90–95° C. while stirring, and after a short period of reaction (15 minutes) the acylation takes place, and a test portion of the reaction mixture is soluble in water to give a clear solution. The product obtained from aqueous solution by salting out with sodium chloride (as described in Example 1) is identical with the product of Example 1.

If the dyestuff from diazotized 4-benzoylamino-2:5 - diethoxy - 1 - aminobenzene and 1-(2'-hydroxy-3'-naphthoylamino)-2-methoxybenzene is acylated as described above, there is obtained an acyl-compound, corresponding to the formula

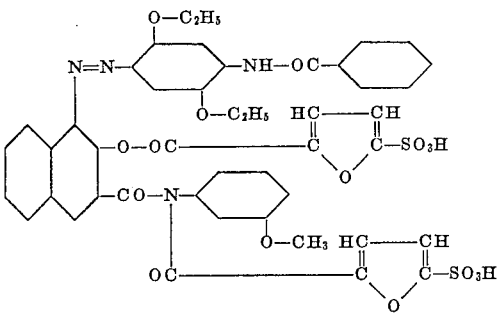

which also dissolves in water with a brown coloration.

Example 3

5.2 parts of thiophene-2-carboxylic acid-5-sulfonic acid are dissolved in 40 parts by volume of dry pyridine while stirring, and 2.85 parts of the azo dyestuff from diazotized 4-benzoylamino-2:5-diethoxy-1-aminobenzene and (2'-hydroxy-3' - naphthoylamino) - benzene are added. 5.2 parts of para-toluene sulfochloride are then added to the reaction mixture, and the mixture is heated to 90–95° C. while stirring. After a reaction period of about 10 minutes, the blue initial pigment is dissolved and a test portion of the reaction mixture dissolves in water to give a clear solution having a brown coloration. The reaction mixture is cooled to room temperature, and is then introduced into a mixture of 150 parts of water and 18 parts of concentrated sulfuric acid, 10 parts of sodium chloride are added and the whole is heated to 40–50° C., after which the reaction product separates well in the form of a resinous deposit. After pouring off the acid pyridine liquor, the residue is dissolved in 150 parts of water while heating it to 40–50° C., the reaction product is again precipitated in solid form by means of 15 parts of sodium chloride at 40–50° C., separated by filtering with suction and dried in vacuo at 40–50° C. The reaction product, which corresponds to the formula

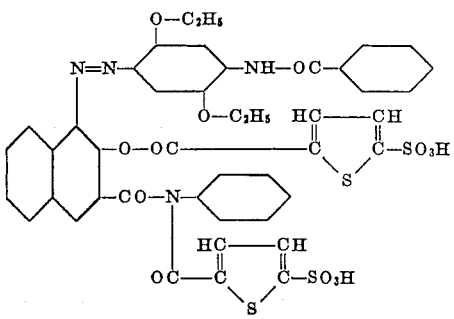

is a brown powder which dissolves in water to give a clear solution having a brown coloration and is separated from solution in the form of the insoluble, blue initial pigment by hydrolysis with dilute alkalis.

*Example 4*

5 parts of the anhydrous disodium salt of furane-2-carboxylic acid-5-sulfonic acid are mixed with 40 parts by volume of dry pyridine while stirring, 4.5 parts of para-toluene sulfochloride are added, and then 1 part of the azo dyestuff from diazotized 4-benzoylamino-2:5-diethoxy-1-aminobenzene and (2'-hydroxy-3'-naphthoylamino)-benzene. The reaction mixture is heated to 90–95° C. while stirring, and after a reaction period of about 2–3 hours a test portion dissolves in water with a brown coloration. The acylation product is isolated in a manner similar to that described in Example 1, and the brown reaction product so obtained is identical with the product of Example 1.

*Example 5*

6 parts of furane-2-carboxylic acid-5-sulfonic acid are introduced into 40 parts by volume of dry chlorobenzene, and 16 parts of triethylamine followed by 6.5 parts of para-toluene sulfochloride are added. The reaction mixture is then heated to about 50–70° C. while stirring, and after a short time an oily brown reaction product is obtained, which deposits at the bottom. 0.5 part of the azo dyestuff from diazotized 4-benzoylamino-2:5-diethoxy-1-aminobenzene and (2'-hydroxy-3'-naphthoylamino)-benzene is added to the reaction mixture, and the mixture is then heated to a gentle boil while stirring, the blue initial pigment passing slowly into solution and a brown reaction mixture being obtained. After cooling the reaction mixture to room temperature, it is poured into dilute sulfuric acid, sodium chloride is added, and then the chlorobenzene is removed together with water by distillation in vacuo. The residue is dissolved in water while heating, freed from a small amount of undissolved initial pigment by filtration, and the reaction product is again salted out by means of sodium chloride, and dried in vacuo. It corresponds to the product of Example 1.

An acyl compound, which corresponds to the formula

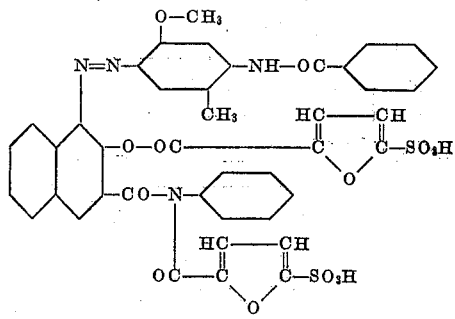

and dissolves in water with a red-brown coloration, is obtained by acylating the dyestuff from diazotized 4-benzoylamino-5-methyl-2-methoxy-1-aminobenzene and (2'-hydroxy-3'-naphthoylamino)-benzene in the manner described in this example.

*Example 6*

6.5 parts of furane-2-carboxylic acid-5-sulfonic acid chloride are dissolved in 40 parts by volume of dry pyridine while gently heating, and then 1.1 parts of the azo dyestuff from diazotized 4-benzoylamino-2:5-diethoxy-1-aminobenzene and (2' - hydroxy - 3' - naphthoylamino)-benzene are added. The reaction mixture is then heated to 90–95° C. while stirring. After a reaction period of about ¼ hour, the blue initial pigment dissolves and a brown reaction mixture is obtained. A test portion of the mixture is soluble in water with a brown coloration. The acylation product is isolated in a manner similar to that described in Example 1 and the resulting reaction product is identical.

*Example 7*

A printing paste is prepared consisting of 40 parts of the reaction product (obtainable as described in Example 1, from furane-2-carboxylic acid-5-sulfonic acid and phosgene with the azo dyestuff from diazotized 4 - benzoylamino - 2:5 - diethoxy-1-aminobenzene and (2'-hydroxy-3'-naphthoylamino)-benzene,
360 parts of water,
100 parts of thiodiglycol,
500 parts of neutral starch-tragacanth thickening 1000 parts.

The above printing colour is printed on a cotton fabric, and the print is dried and with advantage steamed for 3–10 minutes in a Mather-Platt apparatus. The print is then developed by a short passage (about 1 minute) through an ammonia solution of 1–2 per cent. strength, and malted and soaped at the boil. In this manner a fast and strong blue print is obtained.

*Example 8*

In a dyebath consisting of 3 parts of the dyestuff derivative obtainable as described in Example 1, 3000 parts of water and 50 parts of sulfuric acid of 10 per cent. strength, 100 parts of wool are dyed first for ½ hour at 40–90° C. and then for ¼ hour at 90–95° C. In this period the dyestuff is completely taken up by the wool, and a brown dyeing is obtained. The dyeing is then developed for about 5 minutes in an ammonia solution of 1–2 per cent. strength at room temperature, rinsed, soaped for 10 minutes at 40–50° C. with a solution containing, per litre of water, 2 grams of the sodium salt of N-benzyl-μ-heptadecyl-benzimidazole disulfonic acid, rinsed and dried. In this manner a strong blue dyeing is obtained.

What we claim is:

1. An azo dyestuff derivative of the formula

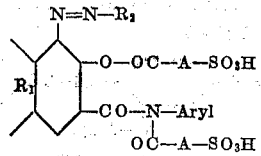

in which $R_1$ represents a cyclic radical condensed on to the benzene radical in the manner indicated, $R_2$ represents the radical of a diazo component containing an —NH—CO— group, the N and C atoms of which are bound aromatically, and A represents a five-membered heterocyclic ring consisting of 4 carbon atoms bound together by conjugate double bonds and one atom selected from the group consisting of oxygen and sulfur, and which dyestuffs derivative is free from substituents imparting solubility apart from the indicated sulfonic acid groups.

2. An azo dyestuff derivative of the formula

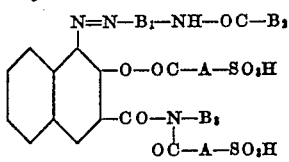

in which $B_1$, $B_2$ and $B_3$ each represent a benzene radical, $B_1$ containing the substituents —N=N— and —NH— in paraposition relatively to one another and A represents a five-membered heterocyclic ring consisting of 4 carbon atoms bound together by conjugate double bonds and one atom selected from the group consisting of oxygen and sulfur, and which dyestuff derivative is free from substituents imparting solubility apart from the indicated sulfonic acid groups.

3. An azo dyestuff derivative of the formula

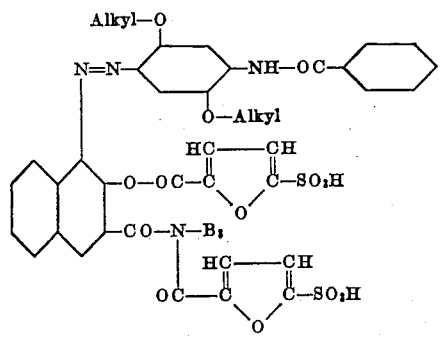

in which the alkyl radicals contain at the most four carbon atoms and $B_3$ represents a benzene radical free from substituents imparting solubility.

4. An azo dyestuff derivative of the formula

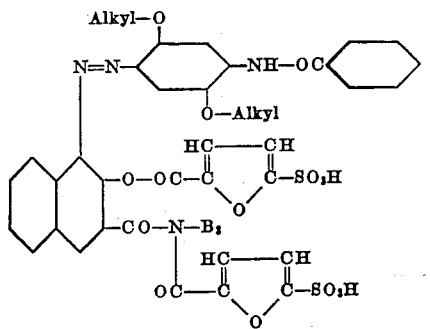

in which the alkyl radicals contain at the most two carbon atoms and $B_3$ represents a benzene radical free from substituents imparting solubility.

5. An azo dyestuff derivative of the formula

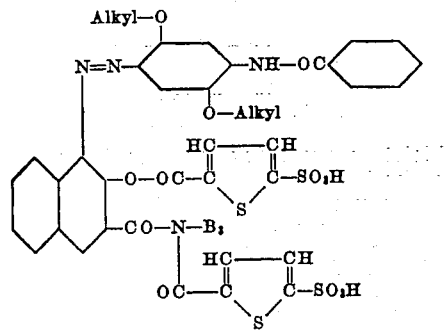

in which the alkyl radicals contain at the most four carbon atoms and $B_3$ represents a benzene radical free from substituents imparting solubility.

6. The azo dyestuff derivative of the formula

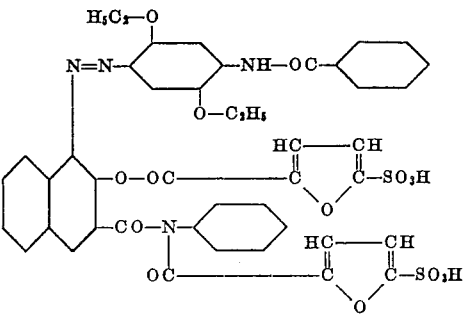

7. The azo dyestuff derivative of the formula

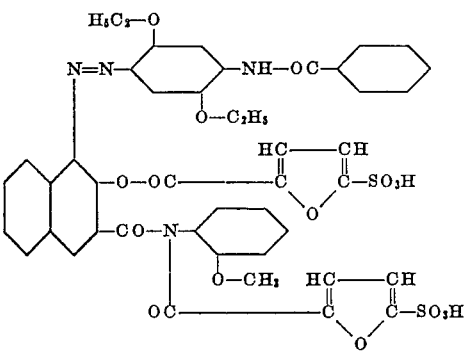

8. The azo dyestuff derivative of the formula

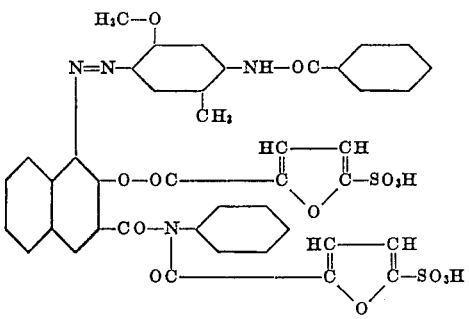

9. The azo dyestuff derivative of the formula

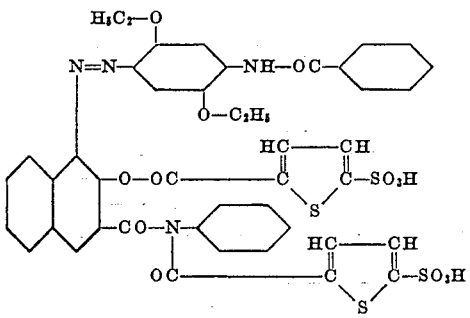

CHARLES GRAENACHER.
HEINRICH BRUENGGER.
ADOLF EMIL SIEGRIST.

References Cited in the file of this patent

UNITED STATES PATENTS

| Number | Name | Date |
|---|---|---|
| 2,064,332 | Zwilgemeyer | Dec. 15, 1936 |
| 2,074,186 | Markush | Mar. 16, 1937 |
| 2,276,187 | Graenacher et al. | Mar. 10, 1942 |